Sept. 5, 1933.　　　J. R. REPLOGLE　　　1,925,281
CONTROL VALVE
Filed Dec. 14, 1931　　2 Sheets-Sheet 1
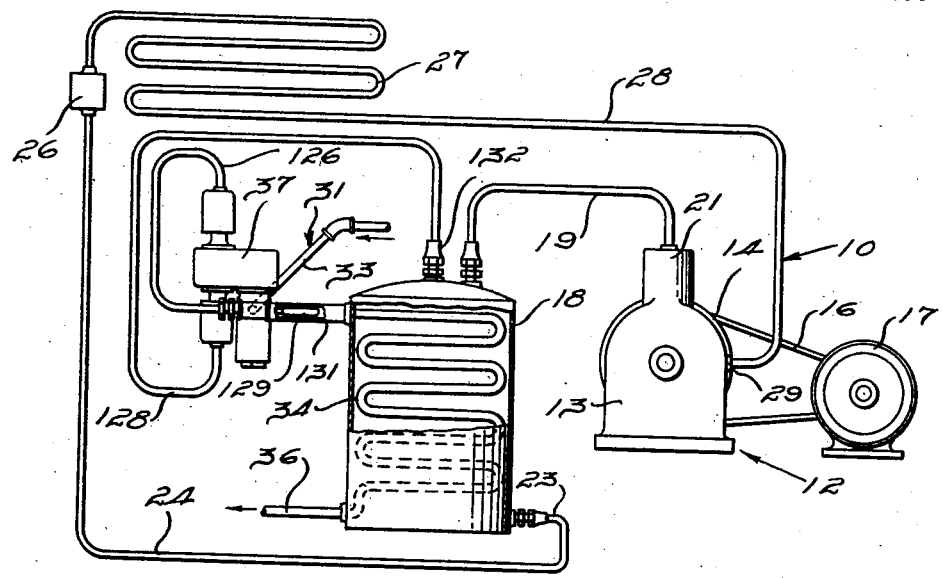
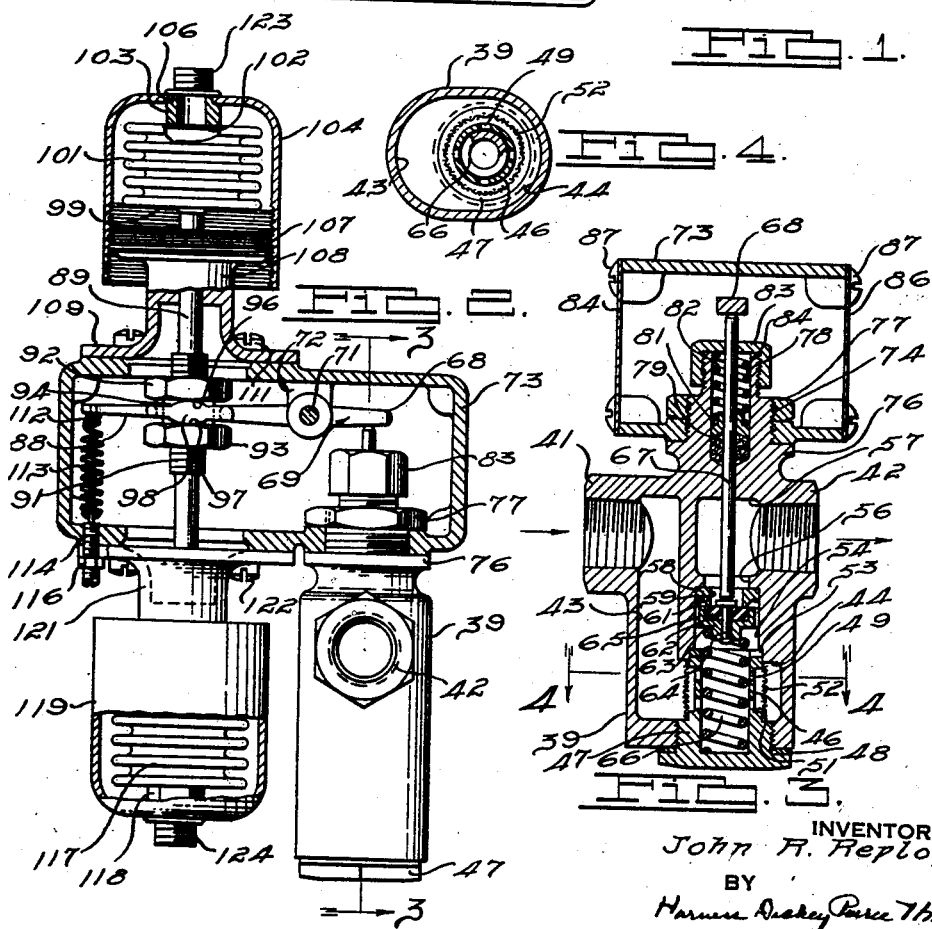
INVENTOR
John R. Replogle.
BY
ATTORNEYS.

Sept. 5, 1933.    J. R. REPLOGLE    1,925,281
CONTROL VALVE
Filed Dec. 14, 1931    2 Sheets-Sheet 2
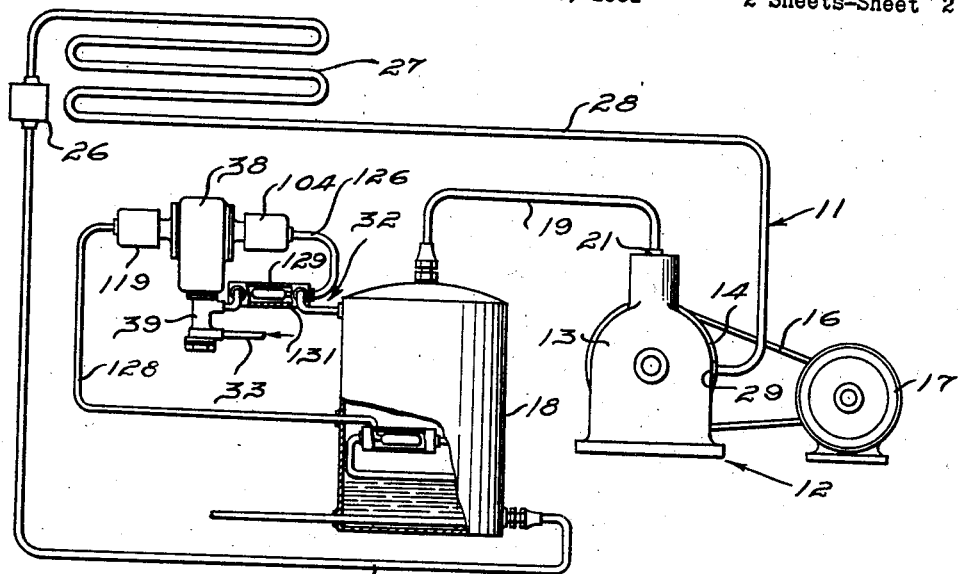
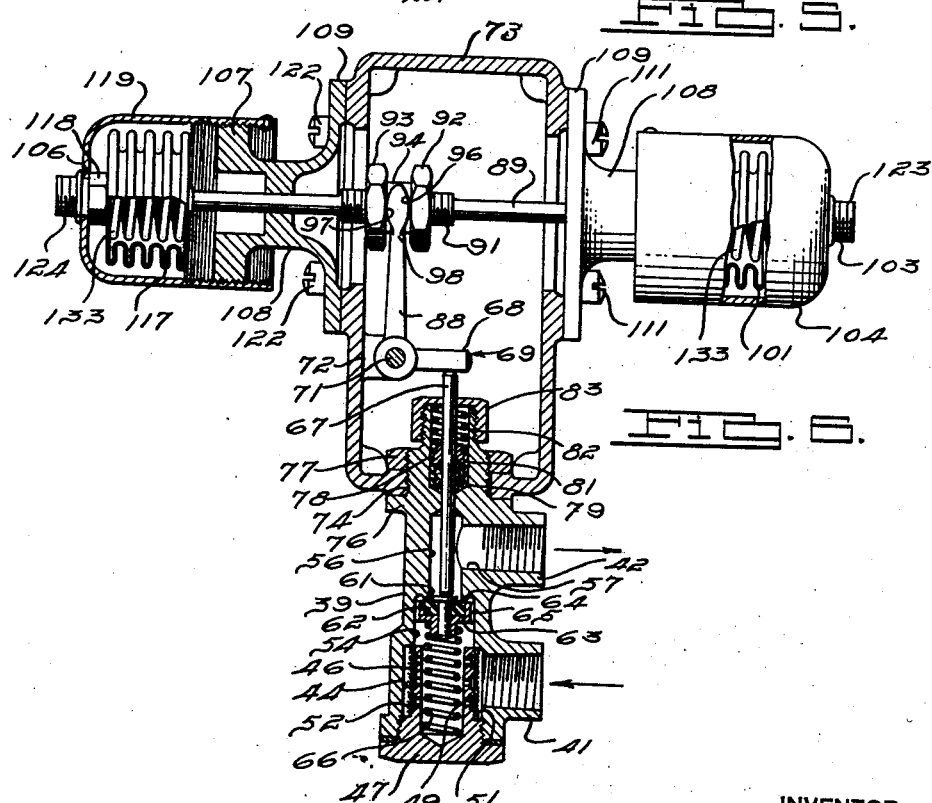
INVENTOR
John R. Replogle.
BY
ATTORNEYS.

Patented Sept. 5, 1933

1,925,281

UNITED STATES PATENT OFFICE 1,925,281

CONTROL VALVE

John R. Replogle, Detroit, Mich., assignor to Copeland Products, Inc., a corporation of Michigan Application December 14, 1931
Serial No. 581,038

19 Claims. (Cl. 62—3)

This invention relates to refrigerating systems and has to do particularly with valves for controlling the supply of cooling water to the condensers of so-called water cooled refrigerating systems such as are widely employed in the larger refrigeration units applicable for work of a commercial nature.

An object of the invention is to so construct a refrigerating system that it will operate efficiently with a minimum of cooling water employed for extracting the heat from the system and likewise with a minimum of electrical energy employed in the mechanical operation thereof.

Another object of the invention is to provide a water valve for a water cooled refrigerating system which will supply cooling water to the condensing unit thereof in proportion to the heat which the condensing unit must dissipate and also to supply water to such condensing unit in proportion to the temperature of the water supplied or in other words in proportion to the amount of heat which the water can absorb.

Prior to the invention a type of water valve which was employed to a large extent in water cooled refrigerating systems was one in which the supply of water was controlled solely by the condensing unit pressure. It was necessary to so adjust this valve that it would start and stop the flow of water to the condenser at a pressure having a corresponding temperature which was somewhat higher than the temperature of the cooling water on the hottest summer day.

For example, on a summer day on which the temperature of the cooling water available was 90 degrees the valve could not be set to start the flow of water to the condenser until a pressure in the condenser corresponding to a temperature higher than 90 degrees was attained. If the valve were set to operate at any lower temperature than this it is obvious that the cooling water would flow through the condenser continuously under such conditions regardless of whether the condensing unit was or was not operating. The next day however, condenser water at a much lower temperature, say for example, at 70 degrees might be available, but the adjustment of the valve which was proper on the previous day would not permit its opening until a pressure corresponding to a temperature greater than 90 degrees prevailed in the condenser.

Now it is well known in the refrigerating art that a refrigerating system operates less efficiently at an unnecessarily high head pressure than it does at a lower head pressure and that a proper head pressure for efficient operation in any refrigerating system depends upon the temperature of the cooling medium available. It should therefore be possible, on the second or cooler day heretofore referred to, to operate the refrigerating system at a much less cost in power consumption if the seventy degree water on that day could be made available to the condenser in such manner as to operate the condenser at a relatively low head pressure. This result, however, is not possible of attainment in such refrigerating system because the water valve employed therein will not permit the flow of water to the condenser until the pressure and corresponding temperature of the condenser is just as high as it might be on the hottest day during the year. Such a system can therefore be set to operate efficiently only upon the hottest day which may be expected throughout the year but upon all other days which are not so hot the refrigerating system must operate with a greater consumption of electrical energy than would actually be required to perform the work demanded of the system.

Another type of water valve which heretofore has been employed to a considerable extent is one which is positively controlled by the flow of electrical energy in the condensing unit. In such system the condensing unit water is turned on as soon as the condensing unit begins its operation and is turned off when such operation is discontinued but the amount of water which is available to the condenser in such system can not be varied to take advantage of different conditions of operations. In order that the system will not become inoperative on a hot day it is necessary to supply enough corresponding hot water to take care of the heat transfer requirements for that day and the same amount of water will be supplied during any other day in the year, notwithstanding that a much less quantity of water might be sufficient. Inasmuch, however, as the condenser water is available at all times regardless of the operating pressure in the condenser it is possible to operate the system at a lower rate of electrical energy consumption than is possible in the system referred to above for the reason that the average head pressure in the system throughout the year will be lower than that prevailing on the hottest day during the year. This system may be said to waste water and to conserve electric energy.

This invention proposes the construction of refrigerating systems in such manner that the amount of water supplied to the condensing unit will be controlled in response to the temperature of the water available and also in response to the service to which the system is subjected. The valve employed in this system is provided with means which tends to open it in proportion to the increase in head pressure or to the temperature corresponding thereto and tends also to open the valve in proportion to variations in the temperature of cooling water available. These two tendencies for variation in the operation of a refrigerating system, act together to admit to the condenser of the system just enough water to maintain the head pressure thereof at a proper value regardless of what the temperature of the cooling water might be.

For a better understanding of the invention, reference may now be had to the accompanying drawings forming a part of this specification in which:

Figure 1 is a diagrammatical view of a refrigerating system in which a water valve embracing the principles of this invention is employed.

Fig. 2 is a side elevational view of the water valve embraced in the system disclosed by Fig. 1 and in which view certain portions of the water valve structure are illustrated in cross section.

Fig. 3 is a transverse sectional view of the water valve illustrated by Figs. 1 and 2 such as might be taken substantially on line 3—3 of Fig. 2.

Fig. 4 is a cross-sectional view of a portion of the water valve structure as it would appear along line 4—4 of Fig. 3.

Fig. 5 is a diagrammatical view of another form of refrigerating system embracing the principles of the invention and in which is employed a water valve similar to that employed in the system disclosed by Fig. 1.

Fig. 6 is a transverse sectional view of a water valve similar to that employed in the system disclosed by Figure 5.

Referring particularly to Figs. 1 and 5 refrigerating systems 10 and 11 each comprise a condensing unit 12 consisting of a compressor 13 driven by a flywheel 14 and belt 16 by a motor 17. The condensing units 12 also embrace condensers 18 which are connected by conduits 19 with the high sides 21 of compressors 13. Liquid refrigerant is supplied by the condensers 18 through liquid lines 24 and expansion valves 26 to refrigerant evaporators 27. Suction lines 28 connected to the discharge ends of the evaporators 27 connect the latter with the low sides 29 of the compressors 13.

In order to provide water or other suitable cooling liquid for the condensers 18 the refrigerating systems 10 and 11 are provided with water circulating systems 31 and 32 respectively each of which consists of a supply line 33, a long sinuous conduit 34 arranged within the condensers 18 and a waste or discharge line 36.

In the refrigerating system disclosed by Fig. 1, the flow of fluid or liquid through the supply line 33 is controlled by a water valve 37 while in the system disclosed by Fig. 5, a water valve 38 of a similar character is employed.

The water valve 37 (see Figs. 1 to 4 inclusive) comprises a casing 39 which is provided respectively with inlet and outlet couplings 41 and 42 for connection between continuous sections of the water supply line 33. The inlet coupling 41 communicates with a vertically disposed opening 43 within the casing 39, the lower end of which terminates at the edge of an annular opening 44 surrounding a sleeve portion 46 of a nut 47 threaded in an opening in the lower end of the casing 39.

A gasket 48 between the edges of the nut and the casing prevents leaks between such parts when the nut is properly tightened.

The sleeve 46 is provided with a plurality of transverse openings 49 which provide communication between the cylindrical opening inside the sleeve and nut and an annular recess 51 formed in the outside surface of the sleeve. A screen 52 wrapped around the outside of the sleeve 46 and overlapping the edges of the recess 51 tends to prevent the flow of any foreign substance which might render the valve inoperative. A soft lead or other metal gasket 53 is disposed between the upper extremity of the sleeve 46 and an annular shoulder located at the lower extremity of a cylindrical opening 54 formed in the casing 39 directly above the sleeve.

The upper extremity of the opening 54 communicates through an opening 56 of slightly reduced diameter with an opening 57 embraced in the outlet coupling 42 of the casing. A shoulder portion of the casing 39 between the openings 54 and 56 supports an annular valve seat 58 having a cylindrical orifice 59 formed centrally therein. The lower or seating surface of the annular valve seat 58 is provided with a tapering flange 61 which is adapted to engage a resilient disc 62 which is secured in an opening formed centrally of a valve or closure member 63 by a rivet or other suitable securing member 64. The closure member 63 is provided externally with grooves 65 for permitting the flow of cooling fluid through the opening 54 when the closure member is unseated. A spring 66 compressed between the closure member 63 and the inside of the nut 47 tends to hold the resilient disc 62 against the seat 58 to prevent the flow of liquid through the orifice 59.

Projecting through the casing 39 above the outlet opening 57 is a rod 67 the lower end of which engages the upper end of the rivet 64 while the upper end thereof is engaged by one end 68 of a lever 69. A pin 71 pivotally supporting the lever 69 between its opposite ends is in turn supported between a pair of lugs 72 projecting downwardly in spaced relation from the upper interior surface of a casing 73 through an opening in the lower side of which the upper end of the casing 39 is threaded as indicated at 74. The casing 73 is retained rigidly against a shoulder portion 76 of the casing 39 by a nut 77 within the casing 73 which is tightened on the threaded end of the casing 39 projecting therein.

The upper end of the casing 39, in the region thereof through which the rod 67 projects, is provided with a cylindrical opening 78 in the lower end of which suitable packing material 79 is compressed by a packing ring 81, a spring 82 and a cap 83 which is threaded on the reduced upper end 84 of the casing 39.

The two sides of the casing 73 which extend in parallel relation to the lever 69 are closed by removable covers 84 and 86 detachably secured to the casing by screws 87.

Extending through openings in the upper and lower surfaces of the casing 73, and in such region as to intersect the path of movement of an end 88 of the lever 69 opposite the end 68, is a rod 89 an intermediate portion of which is threaded as is indicated at 91. Spaced nuts 92 and 93 tightened against the opposite ends of a sleeve 94, surrounding the threaded intermediate portion 91 of the rod 89, are adapted to engage the upper and lower arcuate surfaces 96 and 97 respectively of a yoke 98 formed intermediate the ends of the end 88 of the lever 69 and surrounding the sleeve 94. The upper end of the rod 89 is secured rigidly to the lower closed end 99 of a bellows 101, the upper end 102 of which is secured to the lower end of a supporting ring or sleeve 103 communicating with the interior of the bellows 101 through an opening in the end 102 thereof. The upper end of the sleeve 103 is rotatably secured in an opening formed concentrically in the end of a downwardly projecting cap 104, the sleeve being provided with an annular groove 106 in which the cap is confined.

The lower internally threaded end of the cap 104 is adjustably mounted upon the upper flanged end 107 of a bearing 108 in which an intermediate portion of the upper end of the rod 89 is slidably disposed. The lower end of the bearing 108 is also flanged, as is indicated at 109, and such flanged end is secured by screws 111 to the upper surface of the casing 73 around the opening therein through which the upper end of the rod 89 projects.

In order to provide means for varying the resistance to the opening of the valve 62, the outer end of the end 88 of the lever 69 is connected by a bolt 112 to one end of a coil spring 113, the opposite end of which is connected to the end of a set screw 114 which projects through the lower wall of the casing 73. A nut 116 on the outer end of the set screw 114 provides means for rigidly securing the screw after it has been properly adjusted.

The opposite or lower end of the rod 89 is operatively associated with a bellows 117, a supporting ring 118, an adjustable cap 119 and a bearing 121 attached to the casing 73 by screws 122 and all of which elements are substantially identical to the corresponding elements with which the opposite end of the rod 89 is associated. In view of such similarity of elements, it is apparent that no further description thereof is necessary.

The ends of the supporting sleeves 103 and 118 without the caps 104 and 119, respectively, are threaded as indicated at 123 and 124 for attachment with the ends of relatively small conduits 126 and 128 respectively.

The opposite end of the conduit 126 is provided with a bulb or closed end, indicated at 129, which is inserted within a portion or section 131 of the water supply line 33 extending between the valve 37 and the condenser 18.

The opposite end of the conduit 128 is provided with a coupling indicated at 132 which is in turn attached to the casing of the condenser 18 and thus an open passageway is provided between the interior of the condenser and the interior of the bellows 117. It is not essential, however, that the conduit 132 communicate directly with the condenser 18 as a fluid filled bulb in the condenser and communicating with the conduit might be employed with approximately the same results.

The cooling liquid controlling valve 38 employed in the refrigerating system 11 is substantially like the valve 37 embraced in the refrigerating system 10 and the same reference numerals are, therefore, applied to the corresponding parts of both structures.

In the valve 38, however, as shown in the Fig. 6, there is embraced a slightly modified arrangement of passages between the inlet and outlet in the casing 39 and the latter is secured to the end of casing 73 rather than to one side of the casing as it is in the valve 37. This difference in arrangements of parts in the valve 38 necessitates the disposition of the arms 88 and 68 of the lever 69 at right angles to each other rather than in alignment as in the valve 37. The valve 38 also does not embrace a spring similar to that indicated by the numeral 113 in the structure of the valve 37 but employs instead thereof a spring 133 confined within each of the bellows 101 and 117. Again referring to the valve 38, the conduit 128 communicating with the interior of the bellows 117 instead of being connected directly with the interior of the condenser casing 18, as it is in the refrigerating system disclosed by Fig. 1, such conduit in the system disclosed by Fig. 5 is provided with a closed end or bulb 136 which is confined in a casing 137 inserted above the refrigerant level in the condenser and within the water circulating system 32 adjacent the anchorage end thereof where it will be directly affected by the temperature of the waste water flowing therein.

Referring now to the refrigerating system disclosed by Fig. 1, and assuming the bulb 129, the conduit 126 and the bellows 101 to contain some suitable expansible fluid, it is possible by properly adjusting the spring 113 and the casings 104 and 119 to so adjust the valve 37 that the difference in forces applied to the arm 69 by the expansion and contraction of the bellows 101 and 117 will open the valve closure 63 to such an extent as to supply a proper amount of cooling water at any available temperature to prevent an increase in head pressure within the condenser 18 above a predetermined and proper value for the efficient operation of the system.

The valve thus is operable in response to a variable differential of temperature and the proper adjustment of the valve to provide such differential is determined by the relative cost of water and electricity, by the service desired or by other conditions of operation affecting the system.

However, should the load on the system be increased to any appreciable extent, such increase in load will be reflected in an increase in head pressure within the condenser 18 and such increase in head pressure transmitted through the bellows 101 will provide a greater force tending to open the valve closure 63 and consequently to permit the flow of a greater quantity of cooling water through the water circulating system. Such increase in the amount of cooling water supplied tends to oppose the increase in head pressure within the condenser 18 and consequently to permit the refrigerating system to operate at approximately the same efficiency as it did before the increase in refrigerating load occurred.

Should the temperature of the cooling water be decreased appreciably, due to a change in weather conditions or from any other cause, the fluid in the bulb 129 will also become correspondingly cooler and the resultant change or reduction in volume of the fluid will contract the bellows 101, thus accounting for a slight opening movement of the valve closure 63 and a consequent increase of the quantity of cooling water passing through the cooling water circulating system. This tendency of colder cooling water to open the valve closure 63 to a greater extent is opposed however by the tendency of the bellows 117 to contract under the influence of the reduced head pressure made possible by the colder cooling water, thus causing the spring 113 to tend to close the valve. Such opposing tendencies to open and close the valve simply permits the valve to remain open notwithstanding the change in cooling water temperature and hence the refrigerating apparatus is enabled to operate at a reduced head pressure which is made possible by the lower cooling water temperature.

Obviously, if it were not for the effect of the tendency of the bellows 101 to open the valve due to lower cooling water temperature, it would simply be necessary to adjust the mechanism in such manner that the bellows 117 would open the valve only at a head or condenser pressure having a corresponding temperature somewhat higher than the highest temperature which the cooling water might be expected to attain on an unusually hot day. Under such circumstances of course the valve would not open to permit the flow of cooling water on a day when colder cooling water was available until the head pressure had reached a valve materially higher than that best suited for the operation of the refrigerating system under such circumstances.

In operation the refrigerating system 11 disclosed by Fig. 5 is substantially the same as the operation of refrigerating system 10 illustrated by Fig. 1, and this is true notwithstanding the fact that the bellows 117 in this instance, assuming it to contain a confined expansible fluid is effected by the temperature of the cooling water discharged from the condenser rather than from the pressure of the refrigerant within the condenser. The temperature of the cooling water discharged from the condenser however, is a function of the condenser pressure and for this reason the operation of the systems is substantially identical.

While for the purpose of illustration only two similar forms of the invention have been disclosed herein in detail it will be apparent to those skilled in the art that the invention is not so limited but that various structures other than those herein disclosed are embraced within the spirit of the invention and the scope of the appended claims.

What I claim is:

1. A refrigerating system having a condensing unit including a condenser water circulating system and separate means responsive to the condenser water temperature and to the condition of operation of the condensing unit for controlling the flow of water in said water circulating system.

2. A refrigerating system comprising a condensing unit having a cooling water circulating system associated therewith a valve for controlling the flow of water through said system, means responsive to conditions in said condensing unit for actuating said valve and means thermally independent of said first means and responsive to the temperature of said cooling water for varying the effectiveness of said first means.

3. A refrigerating system comprising a condensing unit having a water circulating system associated therewith, a valve for controlling the flow of fluid in said circulating system, means responsive to conditions in said condensing unit for controlling the operation of said valve and a thermostat remote from said first means and operable in response to cooling water temperature for varying the effectiveness of said means.

4. A refrigerating system comprising a condensing unit having a water circulating system associated therewith, means for progressively increasing the quantity of water flowing through said circulating system as the temperature pressure conditions in the condensing unit increase and means thermally independent of said first means for increasing the flow of water through said circulating system as the temperature of said circulating water decreases.

5. A refrigerating system comprising a condensing unit having a cooling water circulating system associated therewith, a valve for controlling the flow of fluid in said circulating system, means for opening said valve in response to operating temperature and pressure conditions in said condensing unit and means thermally independent of said first means for opening said valve in response to a change in the temperature of said cooling water circulating system.

6. A refrigerating system comprising a condensing unit having an independent fluid circulating system associated therewith, means for varying the flow of fluid in said circulating system, and means thermally independent of said first means and responsive to the temperature of the fluid in said circulating system for controlling said first means.

7. A refrigerating system comprising a condensing unit having an independent fluid circulating system associated therewith, means responsive to conditions in said condensing unit for controlling the flow of fluid in said circulating system and a thermostat thermally independent of said means for modifying the action of said means.

8. A refrigerating system comprising an independent fluid circulating system adapted to exchange heat with said refrigerating system and means thermally independent of said refrigerating system but responsive to the temperature of the fluid in said circulating system for controlling the quantity of flow of said fluid in said circulating system.

9. A refrigerating system comprising an independent fluid circulating system for exchanging heat with said refrigerating system, means responsive to temperature pressure conditions in said refrigerating system for controlling the flow of fluid in said circulating system and means thermally independent of said conditions but responsive to the temperature of the fluid in said circulating system for varying the effectiveness of the first means.

10. A refrigerating system comprising a condensing unit having a cooling fluid circulating system associated therewith, means for varying the flow of fluid in said circulating system, pressure responsive means for actuating said controlling means, and temperature responsive means thermally nonresponsive to said pressure responsive means for actuating said controlling means.

11. A refrigerating system comprising a condensing unit having a cooling fluid circulating system associated therewith, a valve for controlling the flow of fluid in said circulating system, expansible means responsive to conditions in said condensing unit for operating said valve and expansible means thermally independent of said first expansible means but responsive to conditions in said fluid circulating system for operating said valve.

12. A refrigerating system comprising a condensing unit having a cooling fluid circulating system associated therewith, valve means for controlling the flow of fluid in said circulating system expansible means actuated by fluid pressure conditions in said condensing unit for operating said valve means and expansible means thermally independent of said first expansible means and actuated by temperature conditions in said circulating systems for operating said valve.

13. A refrigerating system comprising a condensing unit having a cooling fluid circulating system associated therewith, fluid controlling means for supplying cooling fluid to said circulating system and means responsive to independent temperature conditions in different portions of said circulating system for controlling said fluid controlling means.

14. A refrigerating system comprising a condensing unit having a cooling fluid circulating system associated therewith, a valve for controlling the flow of fluid in said system, a lever for actuating said valve, expansible means for operating said lever, said expansible means being independently responsive to temperature pressure conditions in said circulating system and refrigerating system and an adjustable spring for varying the effectiveness of said expansible means.

15. A refrigerating system comprising a condensing unit having a cooling fluid circulating system associated therewith, expansible means independently responsive to temperature pressure conditions in said circulating and refrigerating systems for controlling the flow of fluid in said circulating system, and adjustable means for varying the effectiveness of said expansible means.

16. A refrigerating system comprising a fluid circulating system independent of said refrigerating system, and adjustable means independently responsive to temperature conditions in said refrigerating and circulating systems for varying the flow of fluid in said circulating system.

17. A refrigerating system comprising a fluid circulating system independent of said refrigerating system but in heat exchanging relation thereto and means independently responsive to fluid temperature in said circulating and refrigerating systems for controlling one of the systems.

18. A refrigerating system comprising an independent fluid circulating system in heat exchanging relation to said refrigerating system, means for controlling one of said systems and means independently responsive to conditions in both of said systems for controlling said first means.

19. A refrigerating system comprising an independent fluid circulating system in heat exchanging relation with said refrigerating system and means responsive to temperature conditions in said circulating system but independently of temperature conditions in said refrigerating system for controlling the operation of said refrigerating system.

JOHN R. REPLOGLE.